UNITED STATES PATENT OFFICE.

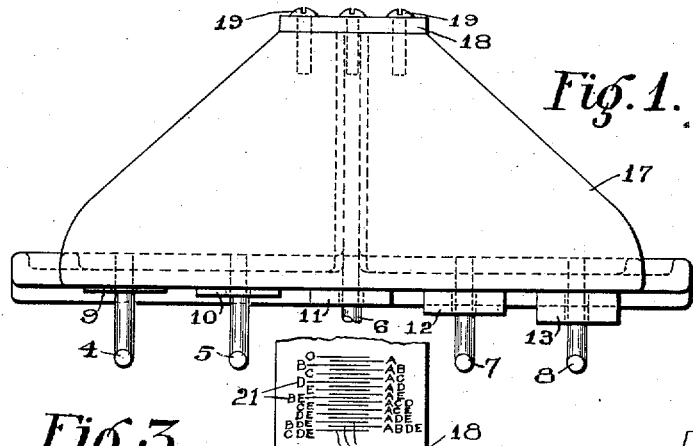

LEROY TABOR AND HORACE K. HATHAWAY, OF PHILADELPHIA, PENNSYLVANIA, ASSIGNORS, BY MESNE ASSIGNMENTS, TO THE TABOR MANUFACTURING COMPANY, OF PHILADELPHIA, PENNSYLVANIA, A CORPORATION OF PENNSYLVANIA.

LATHE-TOOL-SETTING APPARATUS.

1,017,703. Specification of Letters Patent. Patented Feb. 20, 1912.

Application filed July 30, 1909. Serial No. 510,410.

*To all whom it may concern:*

Be it known that we, LEROY TABOR and HORACE K. HATHAWAY, both citizens of the United States of America, residing in the city and county of Philadelphia, in the State of Pennsylvania, have invented certain new and useful Improvements in Lathe-Tool-Setting Apparatus, of which the following is a true and exact description, reference being had to the accompanying drawings, which form a part thereof.

The distance for most satisfactory operation which should exist between the axis of rotation of the work in a metal turning lathe and the plane touched by the cutting nose of the lathe tool as the latter is moved in feeding it into the work is determined by the clearance angle of the tool. If the tool or tools are always so set that the cutting nose or noses touch the same plane, the clearance angle in all cases should be the same, and conversely, of course, if the tools used are always ground with a certain standard clearance angle, the cutting noses should always be set to touch the same plane parallel to the direction of the feeding movement and parallel to the axis of rotation of the work. This has led to the adoption in well ordered shops of a standard clearance angle and a standard plane of movement of the cutting nose in each shop or at least for each lathe or set of lathes of the same type.

In practice, it is entirely feasible to have a tool or set of tools always ground with the desired standard clearance angle. It is, however, impossible to make and maintain the tools so that the cutting nose of each tool is always at the same height above the lower line of the tool body, as the nose is constantly being worn away in use and by the grinding operations to which it is subjected. This necessitates some means for adjusting the tool in a carriage to compensate for the reduction in the height of the tool occurring with use. The simplest and most satisfactory way of adjusting the tool in its carriage is by the use of spacers or blocks inserted between the tool carriage and the under side of the tool.

The purpose of the present invention is the provision of apparatus whereby the proper spacers neccessary for a tool of any height of cutting nose and formed with the standard clearance angle can be determined and supplied with accuracy and rapidity without requiring either calculation or guess work on the part of the operator setting the tool.

The various features of novelty which characterize our invention are pointed out with particularity in the claim annexed to and forming a part of this specification. For a better understanding of our invention, however, and the advantages possessed by it, reference may be had to the accompanying drawings and descriptive matter in which we have illustrated and described one form in which the invention may be embodied.

Of the drawings: Figure 1 is a plan view of the assembled apparatus employed. Fig. 2 is a side elevation, and Fig. 3 is a front elevation.

In the drawings, 1 represents a frame or rack adapted to be secured at its lower edge as by bolts 2 to a tool rack or table 3. Projecting from the upper end of the front face, which is preferably vertical, are a set of hooks, 4, 5, 6, 7 and 8, each of which is intended to support the corresponding one of a series of spacers or setting up blocks, 9, 10, 11, 12 and 13, respectively, each of which is formed with an eye 14 through which the corresponding support hook may pass. As shown clearly in Fig. 1, the spacers 9, 10, 11, 12 and 13 are of progressively increasing thickness, for instance, the thickness of the spacers may be one-sixteenth, one-eighth, one-fourth, three-eighths and one-half inch. Each of the spacers 9, 10, 11, 12 and 13 has marked on it an identifying symbol 15 and a corresponding symbol 16 is placed on the rack to indicate the corresponding one of the hooks 4, 5, 6, 7 and 8. In the construction shown, the spacers 9, 10, 11, 12 and 13 are marked with the symbols A, B, C, D and E, respectively, and symbols A, B, C, D and E are placed on the rack above the hooks 4, 5, 6, 7 and 8 respectively. By this arrangement, the proper reception place on the rack for each of the spacers is readily found.

The member 1 is provided at its upper end with a horizontal flange forming a table 17 upon which the lathe tool 22 may be set as shown in Fig. 2 and a scale 18 is secured to the member 1 as by screws 19 provided with graduations or marks 20 for measuring the elevation of the nose of the cutting tool above the level of the table 17 when the tool is placed as shown in Fig. 2. The graduations 20 are marked with symbols 21 and the gradations are so arranged and the symbols 21 so applied, that when the tool 22 is placed on the table 17 with its nose placed against the scale 18, the symbol or symbols applying to the line at the level of the nose of the tool indicate directly the spacer or spacers to be used with the tool in setting it up in the lathe with the proper elevation of tool nose. Preferably, the symbols 21 are the same symbols or combinations thereof used to identify the spacers, so that, for instance, when the nose of the tool is on the level of the line A C D, the fact is directly indicated that spacers A C D should be used with the tool. This fact, it will be observed, is indicated accurately and instantly and without the necessity for either calculation or guess work on the part of the tool setter, thus avoiding any delay on the part of the tool setter for the purposes of calculation or the possibility of error in calculation, a matter of considerable importance, especially in view of the fact that a considerable percentage of lathe tool operators are not fitted by education or training to make even the simplest mathematical calculations with accuracy and despatch.

The use of the invention increases the accuracy and rapidity by which lathe tools may be set, and thus improves the quality, and increases the amount, of the work turned out.

The apparatus is compact, simple and easy to manufacture and insures the desired accuracy and rapidity in tool setting with a minimum number of spacers.

Having now described our invention, what we claim as new, and desire to secure by Letters Patent is:

A lathe tool setting apparatus comprising a set of tool spacers each marked with an identifying symbol and means for indicating the spacing required for a lathe tool comprising a support having a surface upon which a tool to be set may rest, and a scale above said surface and provided with graduations adapted to register respectively with the nose of a tool resting on said surface according to the elevation of the nose, each of said graduations having applied to it the symbol or combination of symbols applied to the spacer or combination of spacers which, when interposed between said surface and said tool would bring the nose of the tool to a predetermined elevation.

LEROY TABOR.
HORACE K. HATHAWAY.

Witnesses:
D. STEWART,
ARNOLD KATZ.

---

Copies of this patent may be obtained for five cents each, by addressing the "Commissioner of Patents, Washington, D. C."